United States Patent [19]
Erhart

[11] 3,802,120
[45] Apr. 9, 1974

[54] GAME CALL DEVICE

[76] Inventor: Walter Erhart, Box 36, Kirkwood, Del. 19708

[22] Filed: Dec. 5, 1972

[21] Appl. No.: 312,255

[52] U.S. Cl. ............................................. 46/181
[51] Int. Cl. ............................................. A63h 5/00
[58] Field of Search.......... 46/175 R, 178, 179, 180, 46/181, 182

[56] References Cited
UNITED STATES PATENTS

| | | | |
|---|---|---|---|
| 3,656,258 | 4/1972 | Thomas | 46/180 |
| 530,909 | 12/1894 | Stone | 46/178 |
| 1,118,223 | 11/1914 | Parmeter | 46/181 |
| 853,148 | 5/1907 | Alter | 46/181 |
| 3,054,216 | 9/1962 | Testo | 46/180 |

FOREIGN PATENTS OR APPLICATIONS

| | | | |
|---|---|---|---|
| 235,083 | 6/1925 | Great Britain | 46/182 |

Primary Examiner—Robert Peshock
Assistant Examiner—J. Q. Lever
Attorney, Agent, or Firm—Connolly and Hutz

[57] ABSTRACT

A game call such as a duck or goose call comprises a hollow cylindrical body member with a mouthpiece and an air actuated sound generating device, the body member is an article of manufacture generally indicative of an intended use other than as a fowl call.

5 Claims, 11 Drawing Figures

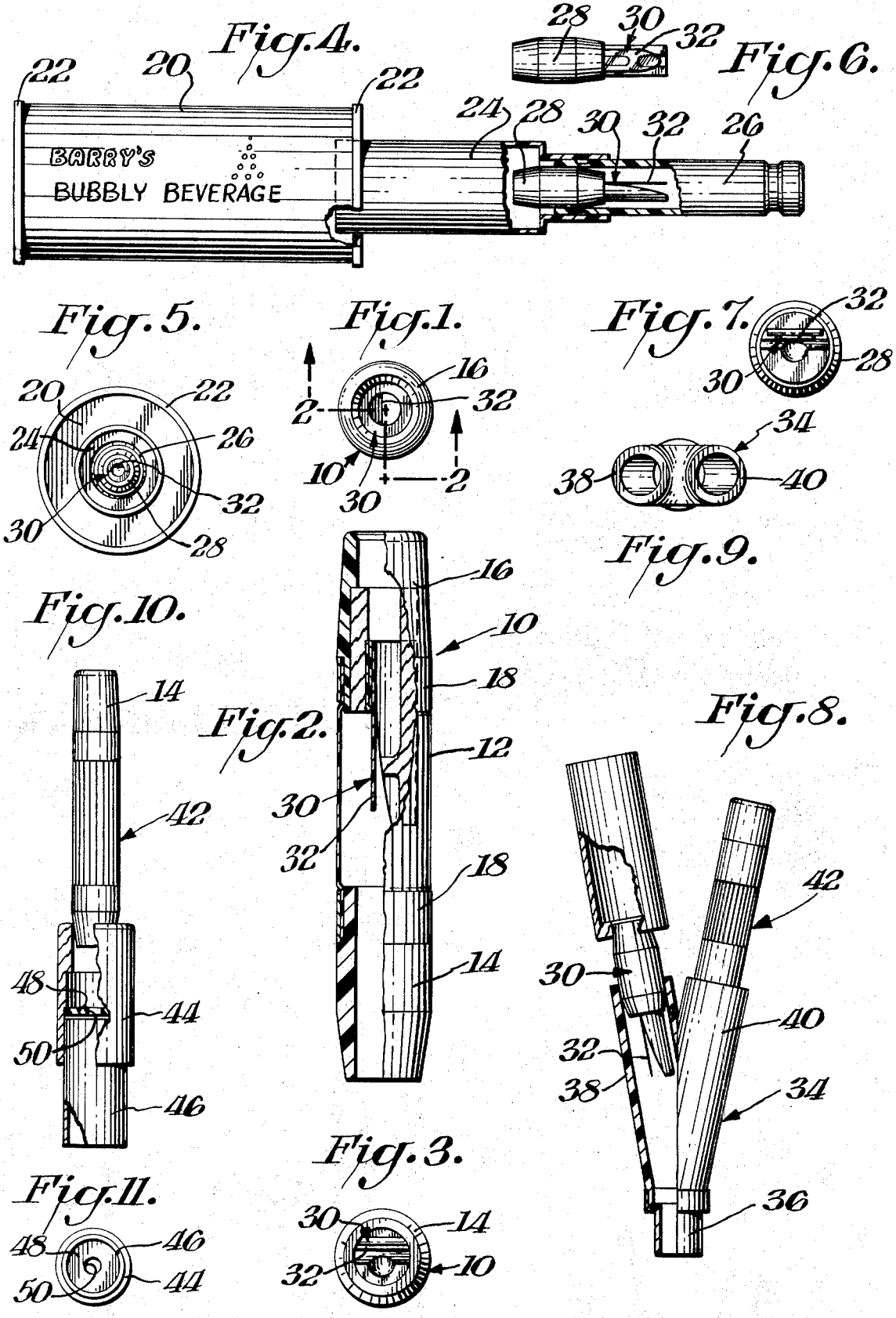

GAME CALL DEVICE

BACKGROUND OF THE INVENTION

Various fowl calls have long been utilized by those skilled in the art as an aid, for example, to duck and geese hunters. Some examples of prior art fowl call devices are found in U.S. Pat. Nos. 742,680; 2,518,616; 2,711,614; 2,729,025; 2,969,611; 3,054,216 and 3,466,794. Other U.S. Pat. Nos. of general interest with respect to the subject matter of this invention include 853,148; 2,096,872; 3,208,161 and 3,487,741.

While the prior art has generally accepted the conventional fowl calls, such devices are not only relatively expensive but are also limited to their singular function as acting as a fowl call.

SUMMARY OF THE INVENTION

An object of this invention is to provide a fowl call which can be economically produced from ready available materials.

A further object of this invention is to provide a fowl call which has the added function of providing an advertising device.

In accordance with this invention a game or fowl call such as a duck or goose call comprises a hollow cylindrical body member with a mouthpiece and an air actuated sound generating device. The body member is an article of manufacture generally indicative of an intended use other than a fowl call.

Advantageously, the body member is an article of manufacture which is generally associated with hunters. Thus, for example, in one embodiment of the invention the article of manufacture is a shotgun shell. In an alternative form of this invention the article of manufacture is a beverage container. The fowl call device may incorporate a thin disc with an axial opening to scramble the sound and thereby enhance its effectiveness as a goose call. In a further form of this invention a holder may be provided which includes a plurality of legs radiating from an apex whereby individual calls may be inserted in each leg and be in straight line communication with the apex.

THE DRAWINGS

FIG. 1 is an end elevation view of a fowl call in accordance with this invention;

FIG. 2 is a cross-sectional view taken through FIG. 1 along the line 2—2;

FIG. 3 is an end elevation view similar to FIG. 1 showing the opposite end of the device shown in FIGS. 1–2;

FIG. 4 is a side elevation view partly in section of an alternative form of this invention;

FIG. 5 is an end view of the embodiment of the invention shown in FIG. 4;

FIG. 6 is a plan view of the air actuated sound generating device shown in FIGS. 4–5;

FIG. 7 is an end view of the device shown in FIG. 6;

FIG. 8 is a plan view partly in section of yet another form of this invention;

FIG. 9 is an end view of the holder shown in FIG. 8;

FIG. 10 is a side elevation view partly in section of still another form of this invention; and FIG. 11 is an end view of the embodiment shown in FIG. 10.

DETAILED DESCRIPTION

FIGS. 1–3 show a fowl call 10 in accordance with one embodiment of this invention. As illustrated therein call 10 comprises a cylindrical hollow body member 12 having a mouthpiece 14 mounted to one end of body member 12 and communicating with the hollow interior. A suitable air actuated sound generating device 16 of, for example, the reed type is mounted to the opposite end of body member 12 as by being inserted in the open end of the body member to permit air blown from the mouthpiece to be expelled into the sound generating device thereby creating a simulated fowl call. If desired, the mouthpiece and sound device may be integral and of course, inserted in the same end of body 12 with body 12 acting as an amplifying tube. In accordance with this invention the body member 12 is an article of manufacture generally indicative of an intended use other than as a fowl call and more particularly of having an intended use generally associated with fowl hunters. Thus, for example, in the form of the invention illustrated in FIGS. 1–3 body member 12 is a shotgun shell which is suitably modified to accommodate the mouthpiece 14 and sound generating device 16. As illustrated in FIG. 2 shotgun shell 12 may be made of conventional material and includes a metal sleeve or collar 18 around each end to provide the necessary reinforcement for the body member thereby minimizing the possibility of the body member rupturing or splitting when the mouthpiece and sound device are inserted therein or during normal usage. Advantageously, use may be made of the collars or sleeves which are conventionally already applied to such shotgun shells. Accordingly, body member 12 not only effectively functions as a conduit for the air blown through mouthpiece 14 (and in certain arrangements acts as an amplifying tube) but also renders the device capable of being produced at low cost since it is already an inexpensive staple article of manufacture. A further advantage of utilizing an article such as a shotgun shell for body member 12 is, where spent shells are used, that use is thereby made of an article which would ordinarily be discarded. A still further advantage of utilizing an article such as a shotgun shell in the fowl call device in that it provides a convenient means of advertisement by, for example, shotgun shell manufacturers who would ordinarily cater to such hunters.

The concepts of this invention may be carried out in various manners without departing from the spirit thereof. Thus as shown in FIGS. 4–5 the staple article of manufacture may be a beverage container 20 which is likewise generally associated with hunters. In this embodiment of the invention the reinforcing collars are formed on container 20 by the outwardly turned beaded edges 22 at each end thereof. It is to be understood that container 20 may be adapted to receive directly a mouthpiece and sound generating device in a manner similar to the shotgun shell illustrated in FIGS. 1–3. However, in order to illustrate other features of this invention FIG. 4 shows the container 20 functioning as an amplifying tube. In this respect a plurality of amplifying members 24 are provided which are connected to each other in such a manner that their diameters progressively increase in a direction away from the mouthpiece 26. In the embodiment illustrated in FIG.

6 the sound generating device 30 is connected directly to vibrating element holding member 28 and is inserted in mouthpiece 26. Thus in accordance with this invention the sound generating device may be mounted directly to the mouthpiece as illustrated in FIG. 4 or may be remote from the mouthpiece. If desired mouthpiece 26 may also be a staple article of manufacture such as the shotgun shell illustrated in FIG. 2. The various members which form the fowl call illustrated in FIG. 4 may be removably connected to telescoping means to permit ready interchangeability of other amplifying members for obtaining precisely the proper call. The amplifying tubes may also be made of any suitable materials such as wood or plastic tubing.

FIGS. 6–7 illustrate an air actuated sound device 30 which advantageously includes a mylar vibrating element 32 for effectively making a goose call by use with a proper amplifying tube.

FIG. 8 shows a further embodiment of this invention wherein a hollow holder 34 is provided having an apex 36 which serves as a mouthpiece and having at least two legs 38, 40 radiating from apex 36. Apex 36 is of tubular form and has an open end so that a user may blow air therethrough into the legs 38, 40. In use a suitable fowl call 42 such as those previously described is inserted in at least one of the legs and the user closes off the remaining legs by placing his hand over the legs or over the calls inserted in the legs so that only one leg is operative. Advantageously the sound generating device 30 is in a straight line communication with the remote open end of leg 36 regardless of which leg is operative. The arrangement of FIGS. 8–9 are particularly advantageous in that, for example, one type of call may be inserted in one leg and another type in another leg. Although the illustrated embodiment shows only two legs the concepts of this invention may be carried out by any number of legs thus providing a variety of calls mounted on a single holder. It is to be further understood that by reversing the reed assembly 30 in leg 38, the device may be used by blowing into the appropriate leg and have the sound exit through apex 36.

FIGS. 10–11 illustrate a further particularly advantageous feature of this invention wherein a call 42 is inserted in an amplifying tube 44 which in turn has a further amplifying tube 46 telescopically arranged therein. In accordance with this invention a solid thin disc 48 is mounted in the amplifying tube 44 in contact with its inner surface with an axial opening 50 being provided in disc 48. The provision of apertured disc 48 is particularly noteworthy in that it results in a scrambled sound which is amplified to simulate a goose call.

It is to be understood that various aspects of this invention may be combined with each other. Thus for example the telescopic arrangement of FIG. 4 is particularly advantageous in creating the sound of a gander and the arrangement may include an apertured disc and/or may utilize a staple article of manufacture as one of the amplifying tubes and/or the mylar vibrating elements. As previously noted the utilization of the apertured disc is desirable where the user wished to convert the fowl call from a duck call to a goose call. As further previously noted holder 34 may also be utilized to incorporate other ramifications of this invention in combination therewith. Additionally, various suitable materials, such as plastic, metal or wood, may be used in accordance with this invention. The various components may also be secured together in any suitable manner as, for example, by screw threads, pressure fits, interlocking elements, detachable collars, etc.

I claim:

1. A fowl call comprising a cylindrical hollow body member, one end of said body member being open to function as a mouthpiece and permit air to be blown therethrough, an air actuated sound generating device mounted in the opposite end of said body member, an axial opening in the assembly comprising said sound generating device and said body member to permit the air blown from said mouthpiece to be expelled from said assembly in the form of a fowl call, said body member being a shotgun shell in the form of a thin cylinder having uniform thickness, a metal sleeve around at least one of the ends of said cylinder to reinforce said end thereof for minimizing rupture and splitting thereto, a hollow cylindrical amplifying member mounted on said hollow body member, a solid thin disc being mounted in said amplifying member downstream from said sound generating device in contact with the inner surface of said amplifying member and an axial opening in said disc to scramble the sound emitted from said sound actuating device.

2. A fowl call comprising a hollow holder member, said holder member having an apex with at least two legs radiating from said apex, said apex being of tubular form and having an open end to function as a mouthpiece whereby air may be blown through said apex and one of said legs, an air actuated sound generating device being mounted in one of said legs in axial alignment with the open end of its leg and in straight line communication with the remote end of said apex regardless of which leg said sound generating device is inserted into to minimize any internal obstruction to the air blown through said mouthpiece and into said sound generating device, and a cylindrical hollow body member removably mounted to said sound generating device for amplifying the sound generated therefrom.

3. A fowl call as set forth in claim 2 wherein said body member has a solid thin disc mounted therein downstream from said sound generating device and in contact with the inner surface of said body member, and an axial opening in said disc to scramble the sound emitted from said sound actuating device.

4. A fowl call as set forth in claim 2 wherein said body member is a shotgun shell.

5. A fowl call as set forth in claim 2 wherein a pair of said legs radiate from said apex.

* * * * *